(12) United States Patent
Lundby

(10) Patent No.: US 6,618,453 B1
(45) Date of Patent: Sep. 9, 2003

(54) ESTIMATING INTERFERENCE IN A COMMUNICATION SYSTEM

(75) Inventor: Stein A. Lundby, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 0 days.

(21) Appl. No.: 09/377,796

(22) Filed: Aug. 20, 1999

(51) Int. Cl.$^7$ .................. H04B 15/00; H04B 1/10
(52) U.S. Cl. ............ 375/346; 375/148; 381/94.1; 455/63; 704/226
(58) Field of Search ................. 375/224, 254, 375/285, 346, 350, 144, 148; 381/94.1, 94.4; 704/226; 455/501, 63, 67.3

(56) References Cited

U.S. PATENT DOCUMENTS

| | | | |
|---|---|---|---|
| 4,810,101 A | | 3/1989 | Kage et al. |
| 5,103,431 A | * | 4/1992 | Freeman et al. ............ 367/135 |
| 5,166,954 A | * | 11/1992 | Grizmala et al. ........... 375/227 |
| 5,199,109 A | | 3/1993 | Baker |
| 5,406,635 A | * | 4/1995 | Jarvinen .................... 381/94.3 |
| 5,666,429 A | * | 9/1997 | Urbanski ................... 381/94.1 |
| 5,694,342 A | * | 12/1997 | Stein ......................... 702/190 |
| 5,710,791 A | * | 1/1998 | Royer et al. ................ 375/224 |
| 5,768,473 A | * | 6/1998 | Eatwell et al. .............. 704/226 |
| 5,950,154 A | * | 9/1999 | Medaugh et al. ........... 704/226 |
| 5,953,380 A | * | 9/1999 | Ikeda ......................... 375/346 |
| 5,960,091 A | * | 9/1999 | White et al. .................. 381/98 |
| 6,041,250 A | * | 3/2000 | DePinto ...................... 600/509 |
| 6,070,137 A | * | 5/2000 | Bloebaum et al. .......... 704/227 |
| 6,097,820 A | * | 8/2000 | Turner ........................ 381/94.3 |

FOREIGN PATENT DOCUMENTS

| | | | |
|---|---|---|---|
| EP | 0688107 | | 12/1995 |
| EP | 0 856 833 | * | 8/1998 |
| EP | 0863618 | | 9/1998 |

OTHER PUBLICATIONS

"Techniques for the Blind Estimation of Signal to Noise Ratio For Quadrature Modulated Signals", Parker, Int'l Symposium on Signal Processing, Aug. 25–30, 1996 pp. 238–241.

"Automatic Noise Floor Spectrum Estimation in the Presence of Signals", Ready et al., IEEE 1998 pp. 877–881.

"Simultaneous Estimation of Process Parameters Noise Variance, and Signal to Noise Ratio,", Niu et al., IEEE Trans. on Signal Processing., vol. 43, No. 7, Jul. 1995, pp. 1725–1728.

"estimation of Signal to Noise Ratio In Signals Contaminated by White Noise", Laguna et al., Processing of Biological Signals, p. 0363–0364, 1991.

"estimation of Signal to Noise Ratio (SNT) In Communication Simulation", Jeruchim et al., IEEE 1989 p. 1274–1278.

"Generalized Signal to Noise Ratio and its Estimation", Khattree et al., IEEE Transactions on Acoustics, vol. 38, No. 12 Dec. 1990 pp. 2136–2139.

* cited by examiner

Primary Examiner—Young T. Tse
(74) Attorney, Agent, or Firm—Philip Wadsworth; Charles D. Brown; Kyong Malek

(57) ABSTRACT

A method and apparatus for improving the transmission of an information signal having message information. A received information signal is formed from an information signal transmitted through an information channel. The received information signal has signal noise. The message information is removed from the received information signal to provide a symbol sequence that is then applied to a first filter to provide a first filtered signal. The power of the first filtered signal is determined and applied to a second filter to provide a second filtered signal representative of the signal noise of the received information signal.

15 Claims, 3 Drawing Sheets

ESTIMATING INTERFERENCE IN A COMMUNICATION SYSTEM

BACKGROUND OF THE INVENTION

I. Field of the Invention

This invention relates to the field of communications systems and, in particular, to the transmission of message signals in a communications system.

II. Description of the Prior Art

In mobile radio communication systems, signals containing message information are transmitted for reception by a plurality of receivers. The signals are transmitted by way of communication channels wherein fading can occur. The fading in the communications channels can cause interference with the received signal and can degrade the received signal, thereby causing message information in the signal to be lost. Furthermore, other transmitting sources of varying power level usually exist and create noise at a receiver. Examples of other noise sources include signals from the same transmitter, signals from other transmitters or signals from different devices such as electric motors, televisions or compact disk players.

Successful recovery of transmitted information is a function of the ratio of the power of the received signal containing the information to the power of the received noise. An indication of the amount of noise that occurs during reception can therefore significantly improve the recovery of information from a received signal. For example, a Turbo decoder which relies on an accurate knowledge of the noise power at the receiver, can be used to improve recovery of information from a received signal. An indication of the amount of noise that occurs during reception can also be used to control the transmit power of the signal, so as to maintain the received signal to noise power at an appropriate level.

SUMMARY OF THE INVENTION

The present invention is directed to a method and apparatus for improving the transmission of an information signal having message information. A received information signal is formed from an information signal transmitted through an information channel. The received information signal has signal noise. The message information is removed from the received information signal to provide a symbol sequence that is then applied to a first filter to provide a first filtered signal. The power of the first filtered signal is determined and applied to a second filter to provide a second filtered signal representative of the signal noise of the received information signal.

BRIEF DESCRIPTION OF THE DRAWINGS

The features, objects, and advantages of the present invention will become more apparent form the detailed description set forth below when taken in conjunction with the drawings in which like reference characters identify corresponding elements throughout and wherein.

DETAILED DESCRIPTION OF THE INVENTION

Figure 1:
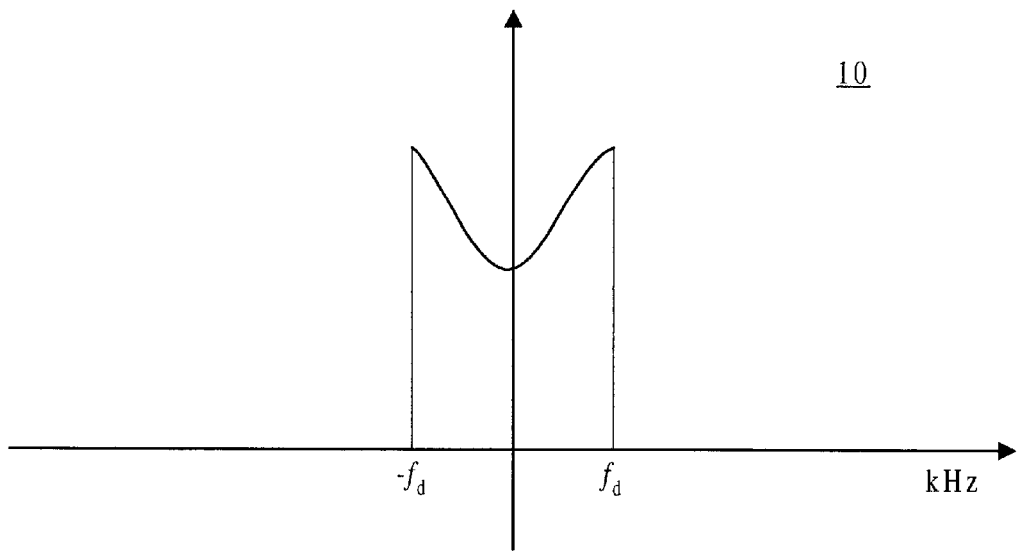
FIG. 1 shows a graphical representation of the spectral density of a Doppler spectrum.

Referring now to FIG. 1, there is shown graphical representation 10 of the spectral density of a Doppler spectrum. The spectral density of graphical representation 10 is well known to those skilled in the art. The Doppler spectrum of graphical representation 10 has a Doppler frequency of $f_d$.

When a coherently modulated signal carrying information is transmitted through an information channel and received in the absence of fading conditions, it is possible for the receiver to demodulate the signal into a sequence of samples $s_i$ of the form:

$$s_i = A a_i + n_i \tag{1}$$

wherein A is a constant or relatively slow varying complex number, $n_i$ is a real or complex noise term of constant or slow varying variance $\sigma^2$, and $a_i$ is a real or complex term that contains the transmitted information. For example, if the transmitted signal were BPSK modulated it would be possible to demodulate the received signal to obtain the sampled signal shown in equation (1) with $a_i = +1$ or $-1$, depending on the transmitted information. $a_i$ is usually referred to in the art as a point of the constellation associated with the modulation scheme.

If the transmitted information ($a_i$) is already known to the receiver or can be determined using a decoding process, then it is a simple task to remove the information from $s_i$ of equation (1) by a rotation combined with a scaling and obtain equation (2) below:

$$s_i' = A + n_i \tag{2}$$

In the theoretical case wherein there is no fading within the transmission channel, the spectrum of $s_i'$ is a centered Dirac corresponding to $f_d$ equal to zero, surrounded by a constant spectrum of noise due to the term $n_i$. However, in most practical cases there is fading in transmission channels carrying a signal with message information. When fading is present in this manner the value of A varies with time and has the band limited power spectral density illustrated by graphical representation 10. The time varying value of A can be represented as $A_i$ and equation (2) can therefore be represented as $s_i' = A_{i+ni}$. Furthermore, note that the power $\sigma^2$ of $n_i$ also varies with time, but usually relatively slowly. The spectrum of $s_i'$ resulting from the time varying $A_i$ is depicted in representation 20 of FIG. 2.

In order to obtain an estimate of the level of interference $\sigma^2$ of a received signal, the method of the present invention uses a priori knowledge of the message information ($a_i$) present in the received signal to derive equation (2) from equation (1). The a priori knowledge can be obtained using a pilot signal or a training sequence. Additionally, it can be obtained by decoding the received signal or by any other technique known by those skilled in the art. Using the a priori knowledge of the information in the received signal, the information ($a_i$) is removed from the received signal.

This provides a signal ($s_i'$) that is substantially without any information content and therefore representative of the fading conditions and noise of the channel through which the received signal transmitted. In a particular embodiment of the present invention discussed below, it will be shown that complete knowledge of the message information ($a_i$) is not required as equation (3) can be derived from equation (1) with limited a priori knowledge.

Figure 2:
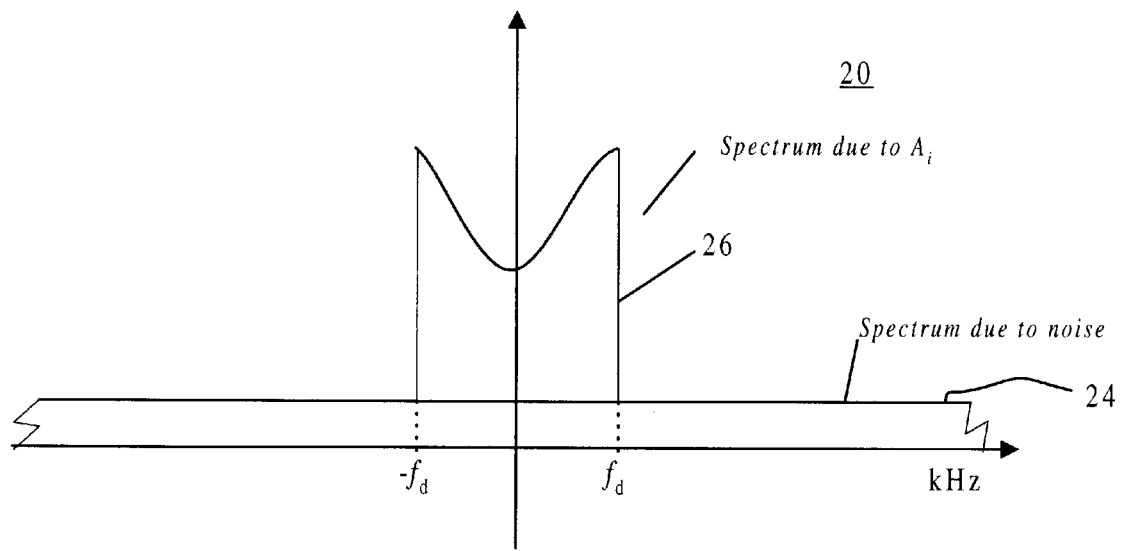
FIG. 2 shows a graphical representation of the spectral density of known symbols within a fading communications channel.

Referring now to FIG. 2, there is shown graphical representation 20 of a typical spectral density of the sequence $s_i'$ within a fading transmission channel. Regardless of the amount of fading in the transmission channel carrying the received signal, a low pass band limited spectrum 24 is present within sequence $s_i'$ as shown in graphical representation 20. Thus, spectrum 26 of graphical representation 20 corresponds to $A_i$ and spectrum 24 corresponds to the noise $n_i$. Therefore, the spectrum of sequence $s_i'$ can be characterized as a noise floor combined with a low pass band limited Doppler spectrum.

Figure 3:
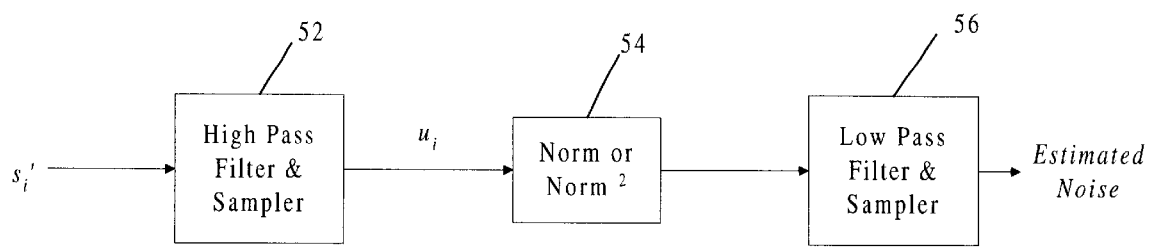
FIG. 3 shows a block diagram representation of the noise estimator system of the present invention.

Referring now to FIG. 3, there is shown a block diagram representation of noise estimator system 50 of the present invention. Noise estimator system 50 receives the sequence $s_i'$ and provides an estimate of the noise power $\sigma^2$ (also called variance) that is present in the channel that transmits the sequence $s_i$. The input sequence $s_i'$ of noise estimator system 50 is first received by high pass filter and sampler 52. High pass filter and sampler 52 eliminates the effect of $A_i$ within the sequence $s_i'$ and preferably re-samples the sequence at a lower rate.

The samples at the output of high pass filter and sampler 52 are designated as the signal $u_i$. The average power of the signal $u_i$ is determined by obtaining its norm raised to the power N within norm operator block 54, with N being any real number different from zero. In addition to being a norm to the power N operator, block 54 can be any other type of operator that removes the sign of a symbol and provides a value that is directly related to the power of its input signal. The output of operator block 54 is applied to low pass filter and sampler 56. The samples provided at the output of low pass filter and sampler 56 are representative of the variance ($\sigma^2$) of the noise ($n_i$) of the received signal.

In the preferred embodiment of noise estimator system 50, high pass filter and sampler 52 can be realized as a finite impulse response filter with taps [1, −1]. This is a straightforward way to implement the required function because it requires only the subtraction of two consecutive symbols of the sequence $s_i'$.

Figure 4:
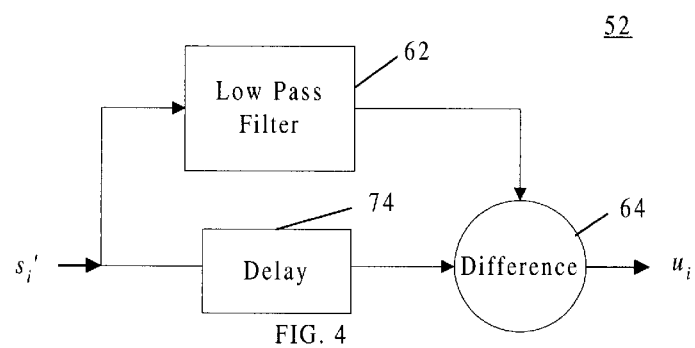
FIG. 4 shows a block diagram representation of one preferred embodiment of a high pass filter suitable for use in the noise estimator system of FIG. 3.

Referring now to FIG. 4, there is shown a preferred embodiment of high pass filter and sampler 52 within noise estimator system 50. The input sequence $s_i'$ of estimator system 50 is received by low pass filter 62 within filter and sampler 52. The filtered output of low pass filter 62 is applied to difference device 64. Difference device 64 computes the difference between the filtered and unfiltered values of the sequence $s_i$. The result of the computation performed by difference device 64 is therefore the desired signal $u_i$. When this embodiment is used the low pass filter can be non-causal. In this case, it is necessary to delay the unfiltered symbols $s_i'$ before computing the difference. The delay operation can be performed by delay block 74 located between the input sequence $s_i'$ and difference device 64.

Figure 5:
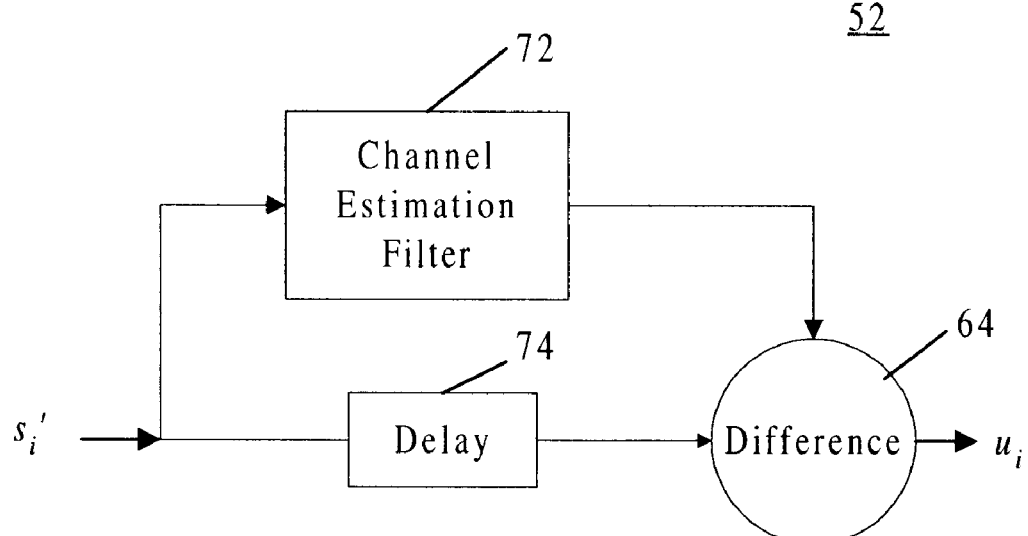
FIG. 5 shows a block diagram representation of a further preferred embodiment of a high pass filter suitable for use in the noise estimator system of FIG. 3.

Referring now to FIG. 5, there is shown another preferred embodiment of high pass filter and sampler 52 within noise estimator system 50. If the input sequence $s_i'$ of noise estimator system 50 is a stream of pilot symbols, it is possible to use channel estimation filter 72 as a low pass filter and thereby eliminate the need for low pass filter 62. In this case the desired output of noise estimator system 50 is the difference between the symbols $s_i'$ and the output of channel estimation filter 72. When this embodiment is used the channel estimation filter can be non-causal. In this case, it is necessary to delay the unfiltered symbols $s_i'$ before computing the difference. The delay operation can be performed by delay block 74 located between the input sequence $s_i'$ and difference device 64. The channel estimation filter will usually also be used to perform coherent demodulation of the transmitted data. Additionally, in this embodiment it may be desirable to follow difference operator 64 by an additional high pass filter in order to remove any bias introduced by an incorrect channel estimation filter 72 in a particular situation.

Both embodiments depicted in FIGS. 4 and 5 can be directly preceded or followed by a down sampler which will reduce the necessary computation rate.

Figure 6:
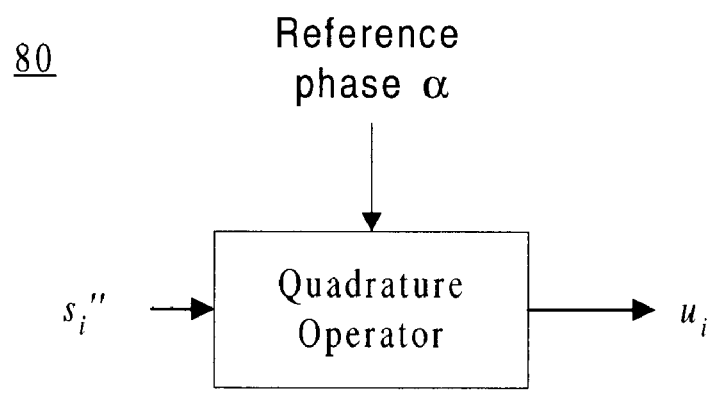
FIG. 6 shows a block diagram representation of a further preferred embodiment of a high pass filter suitable for use in the noise estimator system of FIG. 3.

In a further alternative embodiment, the signal $s_i$ of equation (1) can be transformed with even less a priori knowledge into a signal $s''$ shown in equation (3) below:

$$S_i'' = B_i + n_i \quad (3)$$

where B is an unknown and possibly time varying complex number of known phase $\alpha$. The knowledge of $\alpha$ can be derived from a channel estimation filter or any other means known in the art. It is then possible to replace high pass filter 52 of FIG. 3 by quadrature operator 80 of FIG. 6, which returns a measure of the component of $s_i''$ that is not co-linear (perpendicular) with the complex vector $e^{j*\alpha}$, where j is the imaginary number defined by sqrt(−1). It will be understood by those skilled in the art that quadrature operator 80 can be implemented by simply projecting $s_i''$ onto vector $e^{-j*\alpha}$ and returning the imaginary part of the resulting projection. Quadrature operator 80 may also be implemented by any other way known by those skilled in the art.

When practicing the present invention in a code division multiple access (CDMA) mobile radio communication environment, the different elements of all of the embodiments can be located anywhere between the finger level of the receiver and the output of the RAKE combiner. For example, the high pass filter and the norm or norm to the N operator can be implemented on a per finger basis and the output of all of the fingers can be combined before insertion into a common low pass filter.

The previous description of the preferred embodiments is provided to enable a person skilled in the art to make and use the present invention. The various modifications to these embodiments will be readily apparent to those skilled in the art, and the generic principles defined herein can be applied to other embodiments without the use of the inventive faculty. Thus, the present invention is not intended to be limited to the embodiments shown herein but is to be accorded the widest scope consistent with the principles and novel features disclosed.

What is claimed is:

1. In a code division multiple access system, a method for improving the transmission of an information signal having message information in a communication system with an information channel, comprising the steps of:

(a) receiving the information signal after transmission through the information channel wherein the received information signal has signal noise;

(b) removing the message information from the received information signal to provide a symbol sequence;

(c) applying the symbol sequence to a first filter to provide a first filtered signal;

(d) determining the power of the first filtered signal to provide a determined power signal; and (e) applying the determined power signal to a second filter to provide a second filtered signal representative of the signal noise of the received information signal.

2. The method for improving transmission of the information signal of claim 1, wherein the first filter comprises a high pass filter.

3. The method for improving transmission of the information signal of claim 2, wherein the high pass filter comprises a finite impulse response filter having taps [1, −1].

4. The method for improving transmission of the information signal of claim 2, wherein the first filter comprises a low pass filter and a difference device.

5. The method for improving transmission of the information signal of claim 4, wherein the difference device determines the difference between the symbol sequence and the first filtered signal.

6. The method for improving transmission of the information signal of claim 1, wherein the information signal is a pilot signal and the first filter comprises a channel estimation filter and a difference device.

7. The method for improving transmission of the information signal of claim 6, wherein the first filter further comprises a delay device.

8. The method for improving transmission of the Information signal of claim 7, wherein the delay device delays the symbol sequence to provide a delayed symbol sequence and applies the delayed symbol sequence to the difference device.

9. The method for improving transmission of the information signal of claim 1, wherein the first filter comprises a phase determining device.

10. The method for improving transmission of the information signal of claim 1, wherein step (d) comprises the step of determining the norm of the first filtered signal.

11. The method for improving transmission of the information signal of claim 1, wherein step (d) comprises the step of determining the norm to the power N of the first filtered signal, where N is a non-zero real number.

12. The method for improving transmission of the information signal of claim 1, wherein the second filter comprises a low pass filter.

13. The method for improving transmission of the information signal of claim 1, wherein step (a) comprises using a priori knowledge of the message information to remove the message information from the received information signal.

14. A code division multiple access communication system having an information channel for performing a method for improving the transmission of an information signal having message information, comprising;

(a) a received information signal having signal noise after the received information signal is transmitted through the information channel;

(b) a symbol sequence formed by removing the message information from the received information signal;

(c) a first filtered signal formed by applying the symbol sequence to a first filter;

(d) a determined power signal formed by determining the power of the first filtered signal; and (e) a second filtered signal representative of the signal noise of the received information signal formed by applying the determined power signal to a second filter.

15. A code division multiple access communication system having an information channel for performing a method for improving the transmission of an information signal having message information, comprising:

(a) means for receiving the information signal after transmission through the information signal has signal noise;

(b) means for removing the message information from the received information signal to provide a symbol sequence;

(c) means for applying the symbol sequence to a first filter to provide a first filtered signal;

(d) means for determining the power of the first filtered signal to provide a determined power signal; and (e) means for applying the determined power signal to a second filter to provide a second filtered signal representative of the signal noise of the received information signal.

* * * * *